US 9,891,736 B2

(12) United States Patent
Watanabe et al.

(10) Patent No.: US 9,891,736 B2
(45) Date of Patent: Feb. 13, 2018

(54) VIBRATING DEVICE AND ELECTRONIC DEVICE USING SAME (71) Applicant: TAIYO YUDEN CO., LTD., Taito-ku, Tokyo (JP)

(72) Inventors: Yoshiyuki Watanabe, Takasaki (JP); Shigeo Ishii, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 12 days.

(21) Appl. No.: 14/903,977

(22) PCT Filed: Jun. 23, 2014

(86) PCT No.: PCT/JP2014/066527
§ 371 (c)(1),
(2) Date: Jan. 8, 2016

(87) PCT Pub. No.: WO2015/005103
PCT Pub. Date: Jan. 15, 2015

(65) Prior Publication Data
US 2016/0170539 A1   Jun. 16, 2016

(30) Foreign Application Priority Data
Jul. 11, 2013   (JP) .................. 2013-145480

(51) Int. Cl.
*G06F 3/041*   (2006.01)
*G06F 3/01*   (2006.01)
(Continued)

(52) U.S. Cl.
CPC .............. *G06F 3/0412* (2013.01); *G06F 3/01* (2013.01); *G06F 3/016* (2013.01); *G06F 3/041* (2013.01);
(Continued)

(58) Field of Classification Search
CPC . G06F 3/01; G06F 3/016; G06F 3/041; G06F 3/0412; G06F 3/16; H04M 19/047; H04M 1/02; H04M 1/0266; Y02B 60/50
See application file for complete search history.

(56) References Cited

U.S. PATENT DOCUMENTS

2004/0164971 A1* 8/2004 Hayward ............ G06F 3/03547
345/179
2006/0232564 A1* 10/2006 Nishimura .............. G06F 3/016
345/173

FOREIGN PATENT DOCUMENTS

JP   2003122507 A   4/2003
JP   2006215738 A   8/2006
(Continued)

OTHER PUBLICATIONS

International Search Report (ISR) dated Aug. 19, 2014, issued for International application No. PCT/JP2014/066527.

*Primary Examiner* — Kumar Patel
*Assistant Examiner* — Insa Sadio
(74) *Attorney, Agent, or Firm* — Law Office of Katsuhiro Arai (57) ABSTRACT In an embodiment, a surface of a smartphone 10 is covered with a transparent protective panel 22 supported by rims 16 of a housing 12, and a display device 18 and touch panel 20 are placed in a storage part 14 of the housing 12. The protective panel 22 is constituted by joining a glass plate 22A and resin plate 22B together, and concave parts 30A, 30B are provided on the joining surface side of the resin plate 22B, with piezoelectric vibrating elements 40 placed therein and joined to the glass plate 22A, wherein vibration is transmitted to the surface of the protective panel 22 as surface acoustic waves, demonstrating a haptic function, and also, audible vibration is generated because the modulus of
(Continued)

elasticity of the resin plate 22B is lower than that of the glass plate 22A, achieving an operation as a speaker (or receiver).

20 Claims, 4 Drawing Sheets

(51) Int. Cl.
  *H04M 1/02* (2006.01)
  *H04M 19/04* (2006.01)
  *G06F 3/16* (2006.01)
(52) U.S. Cl.
  CPC ................ *G06F 3/16* (2013.01); *H04M 1/02* (2013.01); *H04M 19/047* (2013.01); *H04M 1/0266* (2013.01)

(56) References Cited

FOREIGN PATENT DOCUMENTS

| | | |
|---|---|---|
| JP | 2008123453 A | 5/2008 |
| JP | 2011053744 A | 3/2011 |
| JP | 2012203895 A | 10/2012 |

* cited by examiner

VIBRATING DEVICE AND ELECTRONIC DEVICE USING SAME

This application is the U.S. National Phase under 35 U.S.C. § 371 of International Application PCT/JP2014/066527, filed Jun. 23, 2014, which claims priority to Japanese Patent Application No. 2013-145480, filed Jul. 11, 2013. The International Application was published under PCT Article 21(2) in a language other than English.

TECHNICAL FIELD

The present invention relates to a vibrating device with a force feedback function (or haptic function) based on a piezoelectric vibrating element, as well as an electronic device using such vibrating device, and more specifically to improving the property of sound generation from a vibrating surface.

BACKGROUND ART

In the field of mobile devices such as smartphones and tablet PCs, the market is starting to see products with a haptic function to create tactile sensations that can be felt by the fingertips. Many of these products comprise a piezoelectric element attached to glass or other material, and are at the current moment still unable to produce enough vibratory displacement with hard glass, etc. In addition, there is a problem that having to attach an element to the back of cover glass limits the installability of the element in the thickness direction.

For example, Patent Literature 1 below describes a structure comprising piezoelectric elements attached to glass. Patent Literature 1 discloses a touch panel device having a touch panel, a display part provided on the back side of the touch panel, a transparent protective plate formed on the front side of the touch panel, and a piezoelectric vibrating element. It is characterized in that the protective plate is constituted by joining a first glass plate on the front side and a second glass plate on the touch panel side, a step part thicker than the thickness of the piezoelectric vibrating element is provided in the thickness direction on either the first or second glass plate on the joined side, the piezoelectric vibrating element is placed in the step part, and the piezoelectric vibrating element is joined to the first glass plate.

BACKGROUND ART LITERATURE

Patent Literature

Patent Literature 1: Japanese Patent Laid-open No. 2012-203895

SUMMARY OF THE INVENTION

Problems to Be Solved by the Invention

Patent Literature 1 above, although having a haptic function, is unable to generate enough audible sound from the laminated glass (transparent plate). In other words, it presents a problem of not outputting enough sound volume required by a speaker.

The present invention was developed by focusing on the aforementioned point and one object of the present invention is to provide a vibrating device that achieves a haptic function by reliably transmitting vibration to the panel surface even when the force or displacement is small, without increasing the thickness, and also offers a speaker (receiver) function through which audible sound can be generated. Another object of the present invention is to provide an electronic device using such vibrating device.

Means for Solving the Problems

The vibrating device proposed by the present invention has: a first transparent plate; a second transparent plate placed on one side of the first transparent plate and having a storage part formed in the thickness direction on the side joined to the first transparent plate; and a piezoelectric vibrating element placed in the storage part of the second transparent plate and joined to the first transparent plate; characterized in that the modulus of elasticity of the second transparent plate is lower than the modulus of elasticity of the first transparent plate.

A key embodiment is characterized in that a third transparent plate having the same modulus of elasticity as the first transparent plate is placed on the side of the second transparent plate not joined to the first transparent plate. Another embodiment is characterized in that the thickness of the first transparent plate is 0.05 to 0.3 mm. Yet another embodiment is characterized in that the thickness of the second transparent plate is 0.4 to 0.6 mm. Yet another embodiment is characterized in that the ratio of the thickness t1 of the first transparent plate to the thickness t2 of the second transparent plate, or t1/t2, is 0.1 to 0.5. Yet another embodiment is characterized in that the first transparent plate is a glass plate. Yet another embodiment is characterized in that the second transparent plate is a resin plate.

The electronic device proposed by the present invention is characterized in that it has a vibrating device according to any one of the foregoing. A key embodiment is characterized in that it has a touch panel and a display part provided on the back side of the touch panel, with the vibrating device placed on the front side of the touch panel as a protective plate. The aforementioned and other objects, characteristics and benefits of the present invention are made clear from the detailed explanations below and the drawings attached hereto.

Effects of the Invention

According to the present invention, there are a first transparent plate, a second transparent plate placed on one side of the first transparent plate and having a storage part formed in the thickness direction on the side joined to the first transparent plate, and a piezoelectric vibrating element placed in the storage part of the second transparent plate and joined to the first transparent plate, where the modulus of elasticity of the second transparent plate is lower than the modulus of elasticity of the first transparent plate. This allows enough vibration needed for the haptic function to be transmitted even when the force or displacement is small, and also provides a vibrating device having a speaker (receiver) function for generating audible sound. In addition, a haptic function and speaker function can be added without increasing the thickness of the vibrating device, which results in improved installability and slimness.

BRIEF DESCRIPTION OF THE DRAWINGS

FIG. 2 (A) is a section view of the part where the piezoelectric vibrating elements are installed, cut along line #A-#A of FIG. 1 (A) above and viewed from the direction of the arrows, while FIG. 2 (B) is a section view of the protective panel in an example of variation.

MODE FOR CARRYING OUT THE INVENTION

The best mode for carrying out the present invention is explained in detail below based on an example.

Example 1

Figure 1:
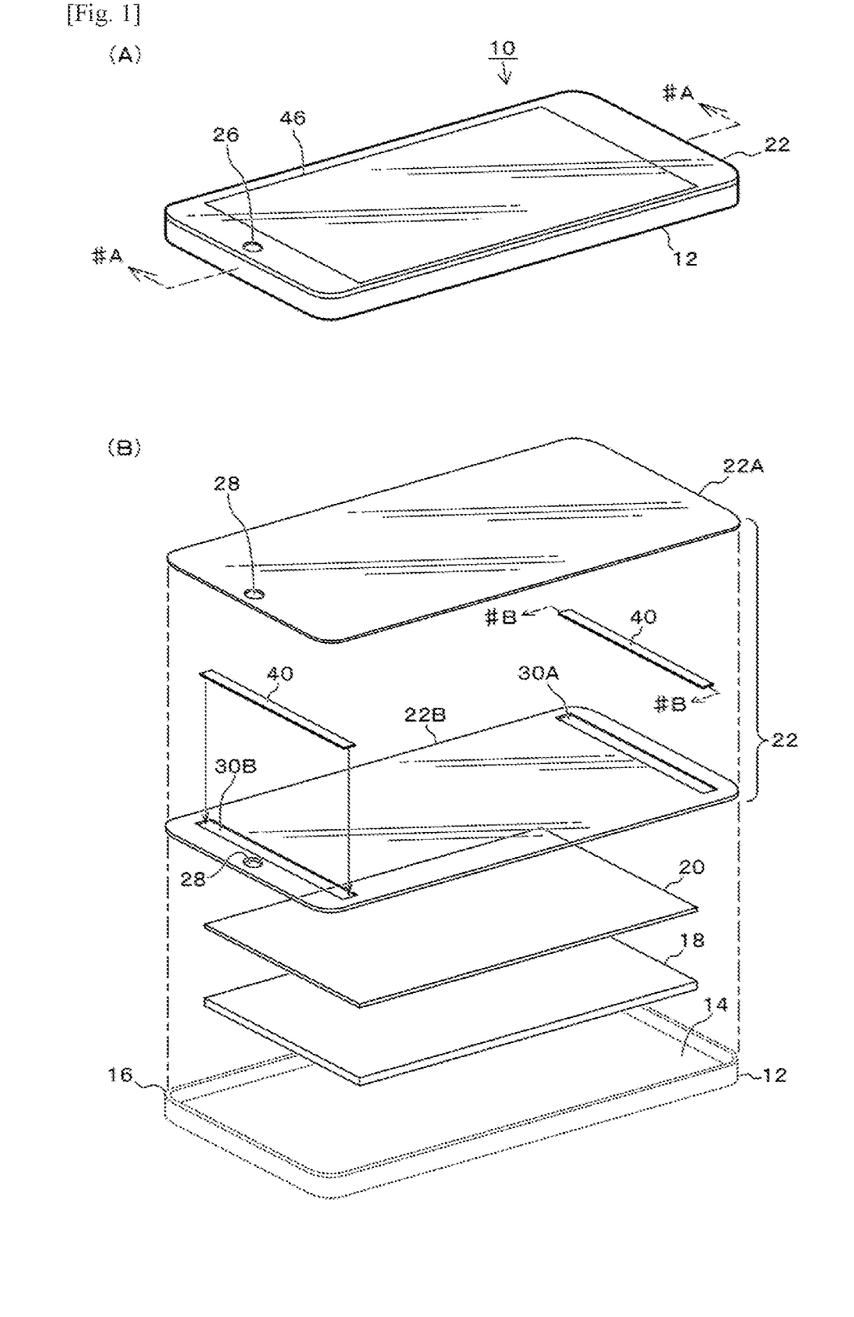
FIG. 1 Drawings showing the smartphone in Example 1 of the present invention, where (A) is an overall perspective view of the exterior and (B) is an exploded perspective view of the panel display part.
Figure 2:
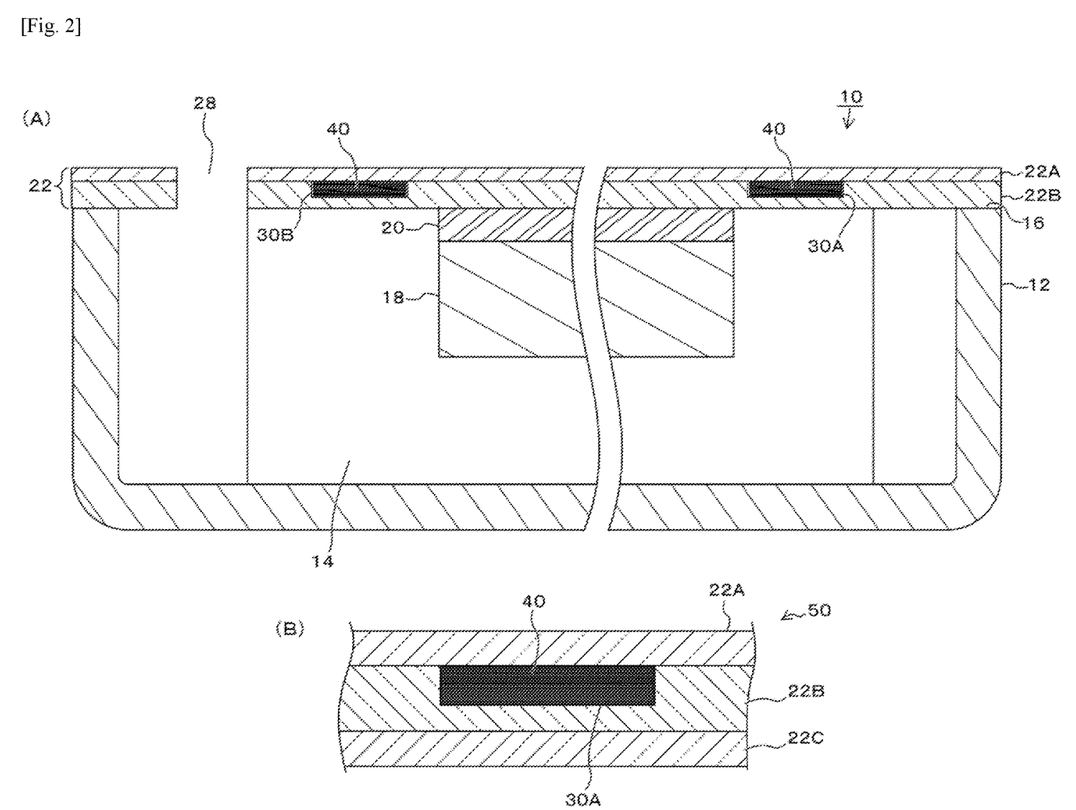
Figure 3:
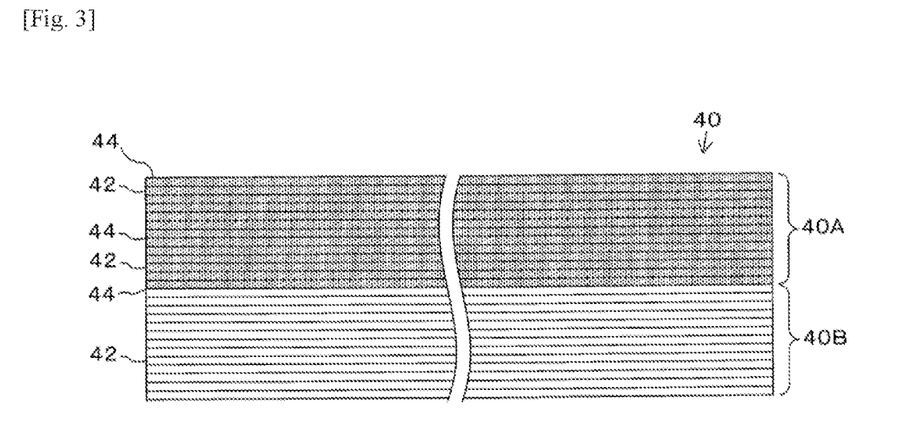
FIG. 3 Section view of the piezoelectric vibrating element, cut along line #B-#B of FIG. 1 (B) above and viewed from the direction of the arrows.
Figure 4:
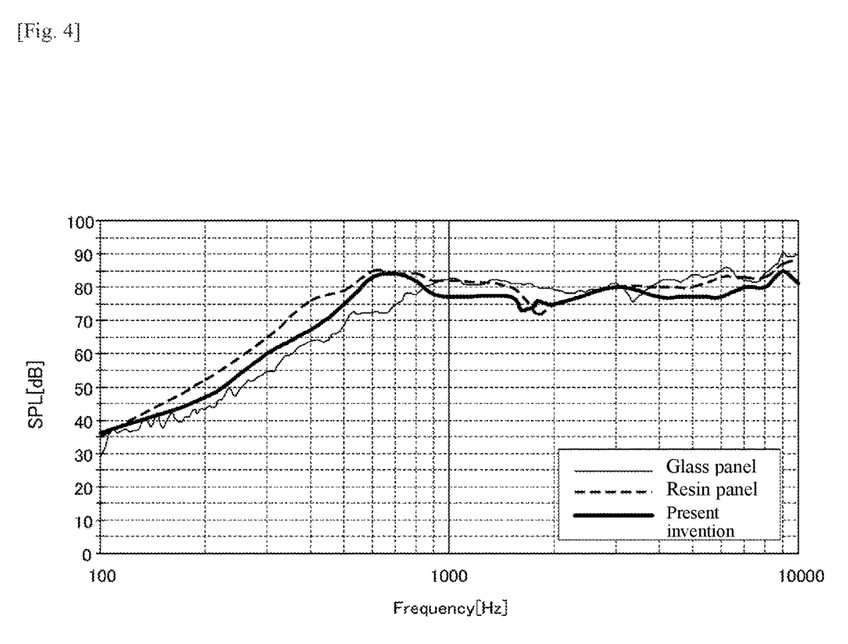
FIG. 4 Graph showing the sound pressure frequency characteristics of an example and comparative examples of the present invention.

First, Example 1 of the present invention is explained by referring to FIG. 1 to FIG. 4. The present invention relates to an art of installing a haptic function that allows for perception of inputs through tactile sensations, and a panel speaker function, to electronic devices having a display device and a touch panel function accompanying the display device, such as mobile phones and smartphones as well as car navigation systems and game consoles. In this example, a smartphone is explained as an example of the aforementioned electronic devices. FIG. 1 provides drawings showing the smartphone in this example, where (A) is an overall perspective view of the exterior and (B) is an exploded perspective view of the panel display part. FIG. 2 (A) is a section view of the part where the piezoelectric vibrating element is installed, cut along line #A-#A of FIG. 1 (A) above and viewed from the direction of the arrows, while FIG. 2 (B) is a section view of the protective panel in an example of variation. FIG. 3 is a section view of the piezoelectric vibrating element, cut along line #B-#B of FIG. 1 (B) above and viewed from the direction of the arrows. FIG. 4 is a graph showing the sound pressure frequency characteristics of this example and comparative examples.

As shown in FIG. 1 and FIG. 2, a smartphone 10 in this example is constituted in such a way that a display device 18 and touch panel 20 are placed in a storage part 14 of its housing 12 and nearly all of its surface is covered with a transparent protective panel 22 (protective plate), with the protective panel 22 supported on a rim 16 of the housing 12. Here, "transparent" means that the content displayed on the display part provided on the back side of the protective plate is visually discriminable through the protective plate. The protective panel 22 has an opening 28 for an operating switch 26, but since the entire protective panel 22 functions as a receiver, no opening is provided through which to release sound. A display area 46 where images, etc., are actually displayed occupies a limited range at the center part of the protective panel 22.

The protective panel 22 is a joined plate constituted by a glass plate 22A (first transparent plate) on the front side joined with a resin plate 22B (second transparent plate) on the touch panel 20 side, where a chemically reinforced glass, etc., is used for the glass plate 22A. The modulus of elasticity (Young's modulus) of the glass plate 22A is approx. 60 to 80 GPa, for example. Also, for the resin plate 22B, polycarbonate, acrylic, PET, etc., are used, for example. The modulus of elasticity of the resin plate 22B is lower than the modulus of elasticity of the glass plate 22A, and ranges from approx. 1 to 10 GPa, for example. Also, the thickness of the glass plate 22A is approx. 0.05 to 0.3 mm (50 to 300 µm), for example, while the thickness of the resin plate 22B is approx. 0.4 to 0.6 mm (400 to 600 µm), for example. It should be noted that, in the present invention, the direction in which the touch panel device is visually viewed is defined as the front side (top side or above), while the opposite direction is defined as the back side (bottom side or below).

The touch panel 20 is provided below (or on the back side of) the protective panel 22. For this touch panel 20, an electrostatic capacitance type, resistance membrane type, or any known existing type can be used. Furthermore, the display device 18 is placed below the touch panel 20, and a liquid crystal display device, organic EL display device, etc., can be used for this display device 18 (display part). The protective panel 22 and touch panel 20, and the touch panel 20 and display device 18, are fixed together, respectively, using optically transparent adhesive or tacking tape which is not illustrated. Epoxy or other general material is used for the adhesive, and acrylic tacking agent or other general material is used for the tacking agent.

In addition, piezoelectric vibrating elements 40 are installed on the protective panel 22. In this example, two concave parts 30A, 30B are provided in the resin plate 22B on the bottom side, and the piezoelectric vibrating elements 40 are installed there. The step created by the concave parts 30A, 30B is made deeper than the thickness of the piezoelectric vibrating element 40. Considering the displacement the piezoelectric vibrating element 40 makes as it vibrates, the thickness of the piezoelectric vibrating element 40 is the sum of the thickness of the piezoelectric vibrating element 40 when it is not vibrating, and this displacement at least. As for the piezoelectric vibrating element 40, its top face is joined to the upper glass plate 22A using adhesive or tacking agent or double-sided tape, etc., while its bottom face side is supported by the bottom faces of the concave parts 30A, 30B.

In this example, the planar shape of the piezoelectric vibrating element 40 is rectangular, and by securely fixing the two ends of it while loosely fixing the center part, generated vibration can be transmitted to the glass plate 22A efficiently. For this reason, for example, desirably epoxy or other adhesive or double-sided tape whose base material is PET is used for joining the peripheral parts (or both ends), while desirably urethane, silicon or other soft adhesive or soft double-sided tape whose base material is rubber or elastomer is used for joining the center part. The dimensions of the concave parts 30A, 30B are determined according to the dimensions of the piezoelectric vibrating element 40.

The thickness of the protective panel 22 varies depending on the constitution of the device in which it is installed, etc., but it is generally 1 mm or less when the glass plate 22A and resin plate 22B are attached together. In this example, the thickness of the glass plate 22A on the top side is made smaller than the thickness of the resin plate 22B on the bottom side to allow for transmission of vibration even when the force is small. Also, the installed positions of the piezoelectric vibrating elements 40 are outside the range where the touch panel 20 is placed, as shown in FIG. 2 (A), so the vibration of the piezoelectric vibrating elements 40 is not obstructed by the touch panel 20.

Next, the piezoelectric vibrating element 40 is explained. The piezoelectric vibrating element 40 has a structure, as shown in FIG. 3, of multiple piezoelectric layers 42 and electrode layers 44 alternately stacked together, and the one used in this example has a bimorph structure where these layers are polarized in the opposite directions relative to the electric field on the top side 40A and bottom side 40B of the center in the thickness direction. Although its specific structure varies depending on the structure of the electronic device in which it is installed, the piezoelectric vibrating element 40 may have a single-plate structure having no layers, and even when there are layers, a unimorph structure where all piezoelectric layers are polarized in the same direction relative to the electric field can be adopted; however, a layered structure is desired from the viewpoint of keeping the input voltage low, and a bimorph structure is desired from the viewpoint of increasing the generated displacement or generated force. For the material of the piezoelectric layer 42, a piezoelectric material constituted by lead zirconate-titanate and additives is used, for example, but any other material may be used so long as it is a generally known type of piezoelectric ceramics. For the material of the electrode layer 44, any of the various known electrode materials such as silver and platinum can be used.

The piezoelectric vibrating element 40 is installed in a manner being embedded in the resin plate 22B of the protective panel 22, and from the perspectives of the generated displacement and generated force, and also in order to ensure the thickness required by the protective panel 22, desirably its thickness is 0.4 to 0.6 mm. In addition, the length and width of the piezoelectric vibrating element 40, while varying depending on the constitution of the electronic device in which it is installed, are, for example, desirably 60 mm or less for the length and 5 mm or less for the width in the case of the smartphone 10 illustrated in this example, and more desirably 2 mm or more for the width in order to transmit vibration to the glass surface sufficiently. In this example, the thickness, length, and width of the piezoelectric vibrating element 40 were set to 0.5 mm, 50 mm and 3 mm, respectively, by considering the above dimension ranges. Also, 26 piezoelectric layers 42, each having a thickness of 18 μm, were stacked together.

A drive circuit not illustrated is connected to the electrode layers 44 formed on the surface of the piezoelectric vibrating element 40, where electric circuits for this connection may be provided on the surface of the glass plate 22A or resin plate 22B by means of printing, sputtering, etc., or formed by very thin metal wires. By attaching together the protective panel 22 in which the piezoelectric vibrating element 40 has been installed as described above, the touch panel 20, and the display device 18, a touch panel device (or panel display part) having a haptic function pertaining to the present invention as well as a panel receiver function through which audible sound can be generated, is formed.

Next, the operations of this example are explained. When the protective panel 22 is pressed at a position corresponding to the content displayed in the display area 46, the touch panel 20 detects the pressing and inputs a signal to the piezoelectric vibrating element 40 accordingly to make it vibrate. As the piezoelectric vibrating elements 40 vibrate in the concave parts 30A, 30B of the resin plate 22B, their vibration is transmitted as surface acoustic waves to the finger or stylus pen tip pressing the protective panel. As a result, pressing of a switch can be perceived through tactile sensation even when the pressing force is small, compared to when the protective panel 22 is vibrated over its entire dimension in the thickness direction.

The signal to be input here may be a simple sine wave signal or square wave signal or combination of both, or a signal that creates an illusion that a switch has been pressed. In this example, where two piezoelectric vibrating elements 40 are used, controlling the amplitude and phase of the signal input to each element allows for strong amplitude to be induced in a specific in-plane location of the protective panel 22, which in turn allows for selective vibration of the part contacted by the finger, etc.

Also in this example, the present invention may be utilized as a speaker (receiver) using the vibration of the protective panel 22, aside from the aforementioned haptic function. Under the present invention, the modulus of elasticity of the resin plate 22B is lower than the modulus of elasticity of the glass plate 22A and therefore audible vibration can be induced in the glass plate 22A to use it as a receiver. This eliminates the need to provide the sound-releasing holes the protective panel 22 traditionally requires, which is convenient from the viewpoint of waterproofing and also saves the trouble of processing the sound-release holes.

By using the touch panel device (panel display part) thus structured, and also using input signals that are 200-Hz sine wave signals to which the human fingertip is considered most sensitive, the displacement of the protective panel 22 was measured. Also by inputting 100-Hz sine wave signals using the same touch panel device, the sound generated was measured by a microphone positioned 10 cm from the surface of the protective panel 22. As a result, 4 μm of displacement was obtained at an input voltage of 8 Vrms. On the other hand, the sound pressure was high, being 90 dB. As a comparative example, a touch panel device was produced based on a structure of piezoelectric vibrating elements 40 placed below a display device 18, and the displacement and sound pressure were measured in the same manner. The results were 0.3 μm of displacement at the same input voltage of 8 Vrms, and 70 dB of sound pressure, showing that both the displacement and sound pressure dropped significantly compared to the example.

As described above, the following effects are achieved according to Example 1: (1) There are a glass plate 22A, a resin plate 22B placed on one side of the glass plate 22A and having concave parts 30A, 30B formed in the thickness direction on the side joined to the glass plate 22A, and piezoelectric vibrating elements 40 placed in the concave parts 30A, 30B and joined to the glass plate 22A, where the modulus of elasticity of the resin plate 22B is lower than the modulus of elasticity of the glass plate 22A. This allows enough vibration needed for the haptic function to be transmitted even when the force or displacement is small, and also provides a vibrating device having a speaker (receiver) function for generating audible sound. In addition, since the piezoelectric vibrating element 40 thinner than the thickness of the resin plate 22B is attached to the glass plate 22A, the maximum thickness of the protective panel 22 with the glass plate 22A and resin plate 22B attached together does not reach or exceed the thickness of the protective panel 22. As a result, a haptic function and speaker function can be added without increasing the thickness of the vibrating device, which results in improved installability and slimness. Furthermore, use of the resin plate 22B makes the processing easy and also reduces the weight compared to when the entire protective panel 22 is formed with glass, and moreover a high-end feel can be maintained because the surface is the glass plate 22A. Since the protective panel 22 functions as a panel receiver, there is no need to provide sound-releasing holes on the surface, which is advantageous from the viewpoint of processing and that of waterproofing.

(2) Because the bottom face side of the piezoelectric vibrating element 40 is supported by the bottom faces of the concave parts 30A, 30B provided in the resin plate 22B, the piezoelectric vibrating element 40 can be provided in a part not overlapping with the touch panel 20, which prevents the touch panel 20 from obstructing the vibration. (3) Because the glass plate 22A on the front side is made thinner than the resin plate 22B on the touch panel side, vibration can be transmitted even when the force is small. (4) Because the piezoelectric vibrating elements 40 are provided at two locations, controlling the amplitude and phase of the signal input to each element allows for strong amplitude to be induced in a specific in-plane location of the protective panel 22, which in turn allows for selective vibration of the part contacted by the finger, etc.

(5) Because the planar shape of the piezoelectric vibrating element 40 is made rectangular and both ends of it are securely fixed while the center part is loosely fixed, the generated vibration can be transmitted to the protective panel 22 efficiently. (6) Because the piezoelectric vibrating element 40 has a layered structure of multiple piezoelectric layers 42 and electrode layers 44 alternately stacked together, the input voltage can be kept low. (7) Because the piezoelectric vibrating element 40 has a bimorph structure, the generated displacement and generated force can be increased.

FIG. 2 (B) shows an example of variation of this example. In the example shown in FIG. 1 and FIG. 2 (A) as described above, the protective panel 22 has a two-layer structure comprising the glass plate 22A and resin plate 22B; like the protective panel 50 shown in FIG. 2 (B), however, a constitution where a glass plate 22C having the same modulus of elasticity as the glass plate 22A is placed on the side of the resin plate 22B not joined to the glass plate 22A on the front side, is also permitted. This provides the effect that sound quality improves in the audible range. FIG. 4 compares the frequency characteristics of sound pressure levels in the above example against those in comparative examples. The vertical axis of the graph represents the sound pressure level (SPL), while the horizontal axis represents the frequency. In the graph, "Glass panel" corresponds to use of glass plates for both like in the aforementioned prior art, while "Resin panel" corresponds to use of resin plates for both. Based on these graph lines, it is clear that the sound pressure level is better and the speaker function is enhanced compared to the glass panel sample, especially in the low-pitch sound range of 1 kHz or less. In particular, the sound pressure SPL is higher than the conventional glass panel sample for low-pitch sound (600 to 1000 Hz).

It should be noted that the present invention is not limited to the aforementioned example in any way, and various changes may be added to the extent that they do not deviate from the key points of the present invention. For example, the present invention also includes the following: (1) The shape, dimensions, etc., shown in the aforementioned example are only examples and may be changed as deemed appropriate, if necessary. In the aforementioned example, for instance, the shape of the piezoelectric vibrating element 40 is rectangular and the specific example illustrated is based on such rectangular dimensions; however, these are also examples, and the length, width, and thickness of the piezoelectric vibrating element 40 may be increased or decreased as deemed appropriate so long as similar effects are achieved. The same is true with the shape, which can be changed to circular, etc., as deemed appropriate. (2) The piezoelectric vibrating element 40 shown in the aforementioned example has a bimorph structure, but this is also an example and it may have a unimorph structure. (3) The piezoelectric vibrating element 40 shown in the aforementioned example has a layered structure, but this is also an example and it may have a single-plate structure, and even when a laminated structure is adopted, the number of layers may be increased or decreased as deemed appropriate, if necessary.

(4) A glass plate 22A is used for the first transparent plate in the aforementioned example, but a resin plate may be used for the first transparent plate so long as its modulus of elasticity is higher than the second transparent plate (resin plate 22B). The same is true with the glass plate 22C in the example of variation shown in FIG. 2 (B) above, where a resin plate may be used instead. (5) Also for the material from which the piezoelectric vibrating element 40 is formed, any of the various known materials may be used. (6) The number of installed piezoelectric vibrating elements 40 is also an example and, although two are installed in the aforementioned example, only one piezoelectric vibrating element 40 may be installed or three or more may be installed depending on the constitution of the touch panel device or that of the electronic device (such as smartphone 10) in which the touch panel device is provided.

(7) In the aforementioned example, the vibrating device proposed by the present invention is a touch panel device with haptic function and panel receiver function and it is applied to a smartphone; however, this is only an example and the present invention can be applied, for example, to all electronic devices having a display device and a touch panel function accompanying the display device, such as mobile phones, car navigation systems and game consoles. In addition, a pair of vibrating devices according to the present invention may be installed on the left and right for use as a stereo.

INDUSTRIAL FIELD OF APPLICATION

According to the present invention, there are a first transparent plate, a second transparent plate placed on one side of the first transparent plate and having a storage part formed in the thickness direction on the side joined to the first transparent plate, and a piezoelectric vibrating element placed in the storage part of the second transparent plate and joined to the first transparent plate, where the modulus of elasticity of the second transparent plate is lower than the modulus of elasticity of the first transparent plate. This allows enough vibration needed for the haptic function to be transmitted even when the force or displacement is small, and also because audible sound is generated to provide a speaker (receiver) function, the present invention can be applied for touch panels and other vibrating devices with speaker function. In particular, the present invention is used favorably as a vibrating device for mobile terminals, because a haptic function and speaker function can be added without increasing the thickness of the vibrating device.

DESCRIPTION OF THE SYMBOLS

10: Smartphone, 12: Housing, 14: Storage part, 16: Rim, 18: Display device, 20: Touch panel, 22: Protective panel (protective plate), 22A, 22C: Glass plate, 22B: Resin plate, 26: Operating switch, 28: Opening, 30A, 30B: Concave part, 40: Piezoelectric vibrating element, 40A: Top side, 40B: Bottom side, 42: Piezoelectric layer, 44: Electrode layer, 46: Display area, 50: Protective panel

The invention claimed is:

1. A vibrating device having:
   a first transparent plate;
   a second transparent plate having a principal surface joined to and in contact with a principal surface of the first transparent plate and having a storage part which is a recess formed in a thickness direction on the principal surface of the second transparent plate joined to the principal surface of the first transparent plate; and a piezoelectric vibrating element placed in the recess of the storage part of the second transparent plate and being flush with the principal surface of the second transparent plate and joined to the principal surface of the first transparent plate;

wherein a modulus of elasticity of the second transparent plate is lower than a modulus of elasticity of the first transparent plate to the extent allowing vibration needed for a haptic function to be transmitted and for a speaker or receiver function for generating audible sound.

2. A vibrating device according to claim 1, characterized in that a third transparent plate having a same modulus of elasticity as the first transparent plate is placed on a side of the second transparent plate not joined to the first transparent plate.

3. A vibrating device according to claim 2, characterized in that a thickness of the first transparent plate is 0.05 to 0.3 mm.

4. A vibrating device according to claim 2, characterized in that a thickness of the second transparent plate is 0.4 to 0.6 mm.

5. A vibrating device according to claim 2, characterized in that a ratio of a thickness t1 of the first transparent plate to a thickness t2 of the second transparent plate, or t1/t2, is 0.1 to 0.5.

6. A vibrating device according to claim 2, characterized in that the first transparent plate is a glass plate.

7. A vibrating device according to claim 2, characterized in that the second transparent plate is a resin plate.

8. An electronic device characterized by having a vibrating device according to claim 2.

9. A vibrating device according to claim 1, characterized in that a thickness of the first transparent plate is 0.05 to 0.3 mm.

10. A vibrating device according to claim 9, characterized in that a thickness of the second transparent plate is 0.4 to 0.6 mm.

11. A vibrating device according to claim 9, characterized in that a ratio of a thickness t1 of the first transparent plate to a thickness t2 of the second transparent plate, or t1/t2, is 0.1 to 0.5.

12. A vibrating device according to claim 9, characterized in that the first transparent plate is a glass plate.

13. A vibrating device according to claim 9, characterized in that the second transparent plate is a resin plate.

14. An electronic device characterized by having a vibrating device according to claim 9.

15. A vibrating device according to claim 1, characterized in that a thickness of the second transparent plate is 0.4 to 0.6 mm.

16. A vibrating device according to claim 1, characterized in that a ratio of a thickness t1 of the first transparent plate to a thickness t2 of the second transparent plate, or t1/t2, is 0.1 to 0.5.

17. A vibrating device according to claim 1, characterized in that the first transparent plate is a glass plate.

18. A vibrating device according to claim 1, characterized in that the second transparent plate is a resin plate.

19. An electronic device characterized by having a vibrating device according to claim 1.

20. An electronic device according to claim 19, characterized in that it has a touch panel and a display part provided on a back side of the touch panel, and that the vibrating device is placed on a front side of the touch panel as a protective plate.

\* \* \* \* \*